US008712459B2

(12) United States Patent
Lim et al.

(10) Patent No.: US 8,712,459 B2
(45) Date of Patent: Apr. 29, 2014

(54) GROUP CONTROL METHOD FOR MACHINE TYPE COMMUNICATION AND MOBILE COMMUNICATION SYSTEM USING THE METHOD

(75) Inventors: Soon Yong Lim, Daejeon (KR); Mi Jeong Yang, Daejeon (KR); Ae Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 13/230,385

(22) Filed: Sep. 12, 2011

(65) Prior Publication Data

US 2012/0064932 A1    Mar. 15, 2012

(30) Foreign Application Priority Data

Sep. 13, 2010 (KR) .................. 10-2010-0089421
Dec. 22, 2010 (KR) .................. 10-2010-0132112

(51) Int. Cl.
*H04W 4/08* (2009.01)
(52) U.S. Cl.
USPC .......... 455/519; 455/520; 455/509; 455/452.1
(58) Field of Classification Search
USPC .............. 455/509, 519, 520, 518, 452.1, 436, 455/415, 452.2, 67.11, 517, 521; 370/328, 370/329
See application file for complete search history.

(56) References Cited

U.S. PATENT DOCUMENTS

| 2008/0254800 | A1* | 10/2008 | Chun et al. ............... 455/438 |
| 2010/0057485 | A1 | 3/2010 | Luft |
| 2010/0142538 | A1 | 6/2010 | Glover et al. |
| 2010/0189071 | A1* | 7/2010 | Kitazoe ............... 370/331 |
| 2011/0274040 | A1* | 11/2011 | Pani et al. ............... 370/328 |

FOREIGN PATENT DOCUMENTS

| KR | 1020090083357 | 8/2009 |
| KR | 1020100078134 | 7/2010 |

OTHER PUBLICATIONS

InterDigital Communication Corporation, "Group Based Access Procedures," 3GPP TSG SA WG2 Meeting #78, TD S2-101101 (2010).
Zte, "The group bearer for MTC," 3GPP TSG SA WG2 Meeting #77, TD S2-100094 (2010).

* cited by examiner

*Primary Examiner* — John J Lee
(74) *Attorney, Agent, or Firm* — Nelson Mullins Riley & Scarborough LLP

(57) ABSTRACT

Provided are a group control method for providing a machine type communication (MTC) service, and a mobile communication system using the method. The group control method includes categorizing one or more MTC devices into one or more MTC groups, assigning MTC group identifiers to respective MTC groups, setting MTC radio network temporary identifiers (MTC RNTIs) according to the MTC group Identifiers, and using the MTC_RNTIs for addressing the MTC devices belonging to the respective MTC groups.

10 Claims, 3 Drawing Sheets

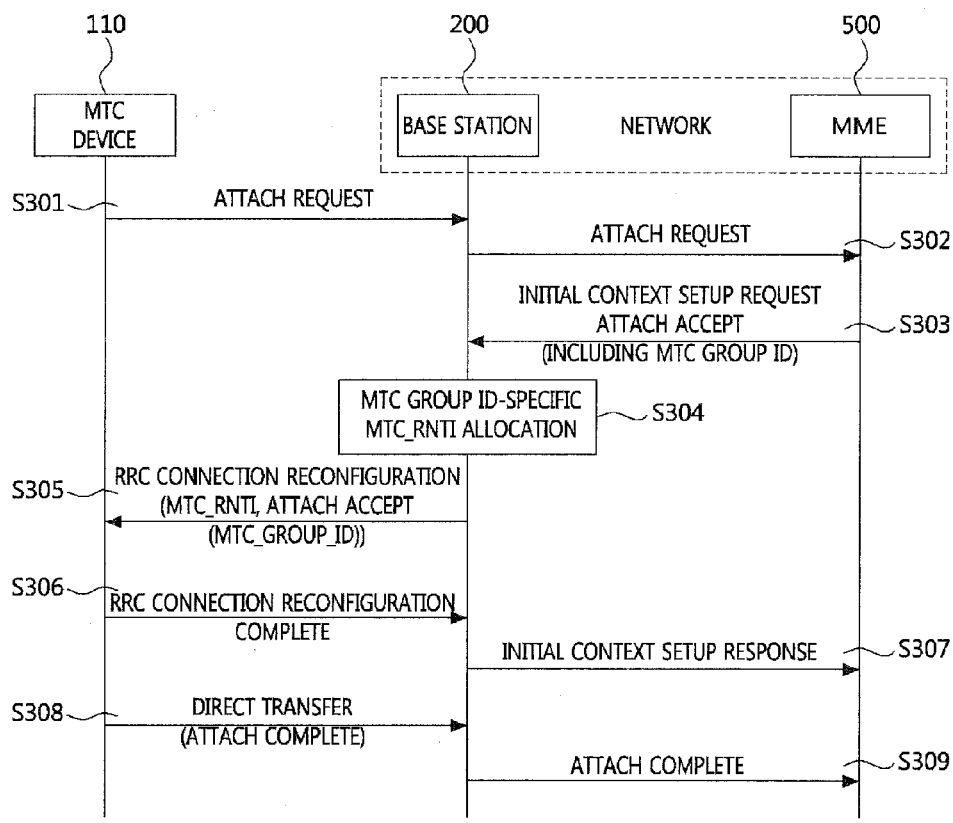
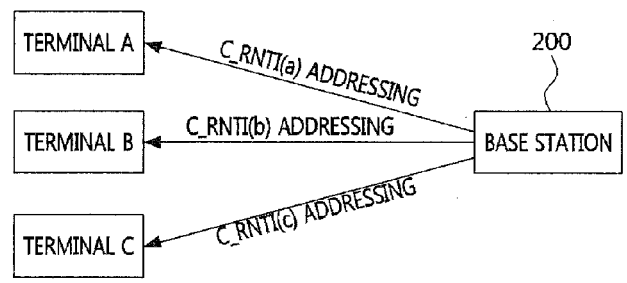

GROUP CONTROL METHOD FOR MACHINE TYPE COMMUNICATION AND MOBILE COMMUNICATION SYSTEM USING THE METHOD

CLAIM FOR PRIORITY

This application claims priority to Korean Patent Applications No. 10-2010-0089421 filed on Sep. 13, 2010 and No. 10-2010-0132112 filed on Dec. 22, 2010 in the Korean Intellectual Property Office (KIPO), the entire contents of which are hereby incorporated by reference.

BACKGROUND

1. Technical Field

Example embodiments of the present invention relate in general to a group control method for providing a machine type communication (MTC) service and a mobile communication system using the method, and more particularly, to a group control method for an MTC service that controls an MTC group consisting of a plurality of MTC devices in a mobile communication system based on Third Generation Partnership Project (3GPP) Long Term Evolution (LTE)-Advanced and a mobile communication system using the method.

2. Related Art

MTC or machine-to-machine communication (M2M) is a form of data communication which involves one or more entities that do not necessarily need human interaction. A service optimized for MTC differs from a service optimized for human-to-human communication. In comparison with a current mobile network communication service, MTC can bpe characterized by a) several market scenarios, b) data communications, c) lower cost and less effort, d) a potentially larger number of communicating terminals, e) a wider service area, and f) very low traffic per terminal.

MTC may be implemented in various forms of service, for example, smart metering, tracking and tracing, remote maintenance and control, and e-health.

Lately, 3GPP has also been working on MTC standardization for intelligent communication between a human and a machine and between machines. For various types of MTC applications having main functions of smart metering, remote control, etc., a huge number of MTC devices are disposed and managed.

In 3GPP LTE systems, MTC devices and general user equipments (or user terminals) are both treated as user equipments (or user terminals), and thus MTC devices also need to be individually registered in an LTE network. The disposition of multiple MTC devices causes scheduling competition for channel allocation, exhaustion of radio resources, overload resulting from signal generation, and so on, thereby exerting a bad influence on general user equipments. With an emphasis put on minimization of the adverse effect caused by the disposition of MTC devices, 3GPP has been working on standardization.

Meanwhile, due to characteristics of MTC devices, an operator can categorize multiple MTC devices of the same kind as one group and manage the devices together. When MTC devices are categorized as an MTC group and managed, several advantages can be obtained in terms of device control and management, billing, etc., and signal overload can be reduced compared to individual terminal control. In particular, network resources are saved when there are many MTC devices.

Although 3GPP has adopted the concept of categorizing and managing MTC devices as an MTC group and is currently drawing requirements from the concept, no effective solution has been proposed yet.

SUMMARY

Accordingly, example embodiments of the present invention are provided to substantially obviate one or more problems due to limitations and disadvantages of the related art.

Example embodiments of the present invention provide a method of allocating a machine type communication (MTC) device to an MTC group in a mobile communication system based on Third Generation Partnership Project (3GPP) Long Term Evolution (LTE)-Advanced, a group control method for an MTC service controlling an MTC device belonging to an MTC group using the method, and a mobile communication system using the group control method.

In some example embodiments, a group control method for an MTC service includes: categorizing one or more MTC devices into one or more MTC groups, and assigning MTC group Identifiers (Identifiers) to respective MTC groups; setting MTC radio network temporary identifiers (RNTIS) according to the MTC group Identifiers; and using the MTC_RNTIs for addressing the MTC devices belonging to the respective MTC groups.

Categorizing the one or more MTC devices into the one or more MTC groups, and assigning the MTC group Identifiers to the respective MTC groups may include: determining, by a mobility management entity (MME) receiving an attach request from a terminal, whether or not the terminal is an MTC device, and whether or not the terminal belongs to an MTC group; and when the terminal having requested the attachment is dete mined to be an MTC device, including, by the MME, an MTC group Identifier in an attach accept message and transmitting the attach accept message to a base station.

Setting the MTC_RNTIs according to the MTC group Identifiers may include: receiving, by the base station, an attach accept message including the MTC group Identifiers from a network; allocating the MTC_RNTIs according to the MTC group Identifiers; and transmitting mapping information between the MTC group Identifiers and the MTC_RNTIs to the MTC devices.

The mapping information between the MTC group Identifiers and the MTC_RNTIs may be transmitted by a radio resource control (RRC) connection reconfiguration message.

Setting the MTC_RNTIs according to the MTC group Identifiers may further include: registering, by the MTC devices receiving the MTC group Identifiers and the MTC_RNTIs, the MTC group Identifiers as their Identifiers.

Using the MTC_RNTIs for addressing the MTC devices belonging to the MTC groups may include: transmitting, by the base station, a paging message including the MTC group Identifiers and paging record information; obtaining, by one or more MTC devices in the corresponding MTC group receiving the paging message, record information corresponding to their MTC group Identifiers; transmitting, by the base station, downlink data addressed with an MTC_RNTI of the MTC group; and receiving, by the one or more MTC devices in the MTC group, the downlink data addressed with the MTC_RNTI.

The base station controls a transmission time and the MTC device controls a reception time so that the downlink data transmission can be performed in a reception window time period of the MTC_RNTI a predetermined time after transmission of the paging message.

In other example embodiments, a mobile communication system performing group control for an MTC service includes: an MME configured to categorize one or more MTC devices into one or more MTC groups, and assign MTC group identifiers to respective MTC groups; and a base station configured to set MTC_RNTIs according to the MTC group identifiers, and use the MTC_RNTIs for addressing the MTC devices belonging to the MTC groups.

In other example embodiments, a base station communicating with a network and one or more MTC device receives MTC group identifiers from the network, sets MTC_RNTIs according to the MTC group identifiers, and uses the MTC_RNTIs for addressing the MTC devices belonging to MTC groups.

The base station may perform addressing using RNTIs distinguished according to the MTC devices when communication between the base station and the MTC devices is performed in a one-to-one mode, and using the MTC_RNTIs when the communication between the base station and the MTC devices is performed in an MTC group mode.

Using the constitution according to example embodiments of the present invention, MTC devices can be categorized into MTC groups and controlled in a 3GPP LTE-Advanced system. Thus, it is possible to reduce the load of controlling a network for the MTC devices and save wired and radio resources.

BRIEF DESCRIPTION OF DRAWINGS

Example embodiments of the present invention will become more apparent by describing in detail example embodiments of the present invention with reference to the accompanying drawings, in which:

FIG. 3 is a signal flowchart illustrating a process of assigning an MTC device to an MTC group according to an example embodiment of the present invention;

FIG. 4 illustrates a general data transfer process in which MTC devices are controlled one by one according to an example embodiment of the present invention;

DESCRIPTION OF EXAMPLE EMBODIMENTS OF THE PRESENT INVENTION

Figure 1:
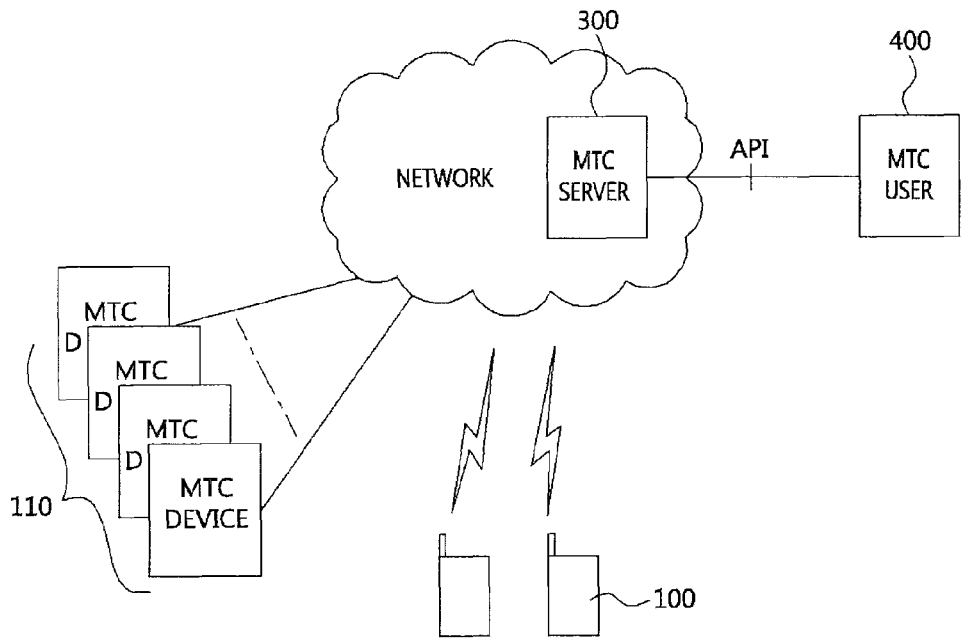
FIG. 1 illustrates a radio communication network that provides a machine type communication (MTC) service to which example embodiments of the present invention are applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal" used herein may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed point communicating with a terminal, and may be referred to as a Node-B, evolved Node-B (eNB), base transceiver system (BTS), access point (AP), and other terms.

Hereinafter, example embodiments of the present invention will be described in detail with reference to the appended drawings.

FIG. 1 illustrates a radio communication network that provides a machine type communication (MTC) service to which example embodiments of the present invention are applied.

As shown in FIG. 1, a radio communication network providing an MTC service includes an MTC server 300 for providing the MTC service, an MTC device 110, an MTC user 400, etc. in addition to a conventional radio communication network including a general terminal 100.

The MTC device 110 is a UE having an MTC function of communicating with the MTC server 300 and other MTC devices via a public land mobile network (PLMN).

The MTC server 300 communicates with the PLMN, and the MTC device 110 via the PLMN. The MTC server 300 has an interface that can be accessed by the MTC user 400, and provides service for the MTC user 400. The MTC user 400 uses the service provided by the MTC server 300.

In the constitution of FIG. 1, the MTC server 300 is controlled by a network operator, who provides an application programming interface (API) to the MTC server 300. The MTC user 400 accesses the MTC server 300 of the network operator through the API.

In FIG. 1, the MTC server 300 is included in a network operator domain. However, the MTC server 300 may not be located in the network operator domain but may be located outside the network operator domain. In this case, the MTC server 300 is not controlled by the network operator.

Also, the MTC device 110 needs to communicate with the MTC server 300, etc. disposed in the network through a base station (not shown). A base station according to an example embodiment of the present invention sets MTC radio network temporary identifiers (MTC_RNTIs) according to MTC group identifiers (IDs), and uses the MTC radio network temporary identifiers for addressing MTC devices belonging to MTC groups.

Figure 2:
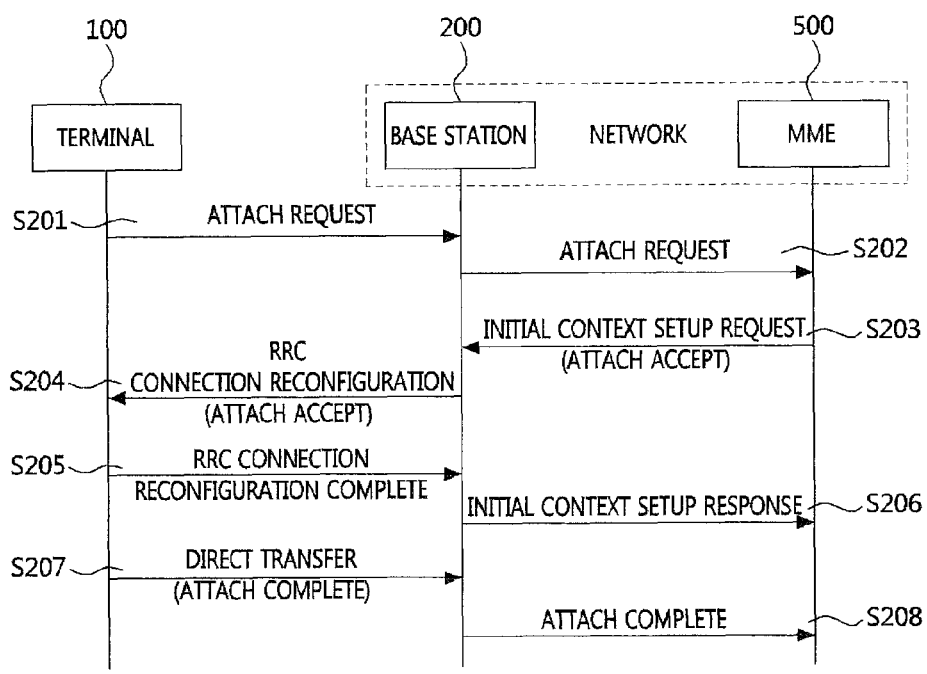
FIG. 2 is a signal flowchart illustrating a general registration process in which attachment is used.

FIG. 2 is a signal flowchart illustrating a general registration process in which attachment is used.

A terminal needs to be registered in a radio communication network so as to access the network and receive service. FIG. 2 illustrates a general registration process of a terminal in which attachment is used.

A base station 200 and an MME 500 in a network perform a terminal registration process. Here, the MME 500 is a control node that processes signaling between a UE and a core network (CN). Main functions of the MME 500 include functions related to bearer management and functions related to connection management.

The network includes a database as a means of the registration process. An attach request from a general terminal 100 is transferred via the base station 200 (S201) to the MME 500 (S202), and the MME 500 receiving the attach request in the network responds to the attach request with an attach accept message (S203 and S204). In this process, radio resource control (RRC) connection reconfiguration is performed between the terminal 100 and the base station 200 (S204 and S205). In the meanwhile, initial context setup is performed between the base station 200 and the MME 500 (S203 and S206). The terminal 100 receiving the attach accept message transfers an attach complete message to the network (S207 and S208), thereby informing the base station 200 and the MME 500 that the attachment process has been successfully completed.

The network defines a state of the terminal 100 that has been attached to the network as "REGISTERED" and manages all the following context. However, the process of FIG. 2 does not show a process of assigning a terminal that is an MTC device to an MTC group.

FIG. 3 is a signal flowchart illustrating a process of assigning an MTC device to an MTC group according to an example embodiment of the present invention.

When a terminal transfers an attach request to a network (S301 and S302), the network determines whether the terminal is an MTC device, and whether the terminal belongs to an MTC group. When the terminal having transmitted the attach request is determined as an MTC device 110, an MME 500 responds to the attach request by including an MTC group Identifier (MTC_group ID) in an attach accept message (S303). A base station 200 receiving the attach accept message from the MME 500 allocates an MTC_RNTI according to the MTC group Identifier (S304). In other words, cell (C)_RNTIs are not allocated according to terminals, but MTC_RNTIs are allocated according to MTC group identifiers.

The base station 200 inserts the MTC_RNTI allocated according to the MTC group and the attach accept message including the MTC group Identifier into an RRC connection reconfiguration message, and transmits the RRC connection reconfiguration message to the MTC device 110 (S305). The MTC device receiving the RRC connection reconfiguration message registers the MTC group Identifier as its ID and thereafter uses the ID for control.

In this way, an MTC group Identifier is assigned to an MTC terminal according to an example embodiment of the present invention. Also, by assigning an MTC_RNTI to an MTC group, MTC devices can all be controlled together through MTC group control. Downlink reception of a 3GPP LTE-Advanced system is performed with priority given to a physical downlink control channel (PDCCH). A PDCCH is configured to address a specific RNTI, and a terminal capable of receiving the RNTI receives data (a signal message or traffic) via a related physical downlink shared channel (PDSCH).

Thereafter, completion of RRC connection reconfiguration (S306), response to initial context setup (S307), and transfer of an attach complete message (S308 and S309) are the same as illustrated in FIG. 2.

FIG. 4 illustrates a general data transfer process in which MTC devices are controlled one by one according to an example embodiment of the present invention.

In FIG. 4, each terminal only receives a C_RNTI addressed to itself with its unique C_RNTI and PDSCH data related to the C_RNTI. In other words, terminals A, B and C receive data through C_RNTI(a) addressing, C_RNTI(b) addressing and C_RNTI(c) addressing, respectively. Thus, a base station allocates as many PDCCHs and PDSCHs as the number of terminals managed by itself, and a large amount of resources corresponding to the PDCCHs and PDSCHs is consumed. Here, each terminal denotes an MTC device according to an example embodiment of the present invention.

Figure 5:
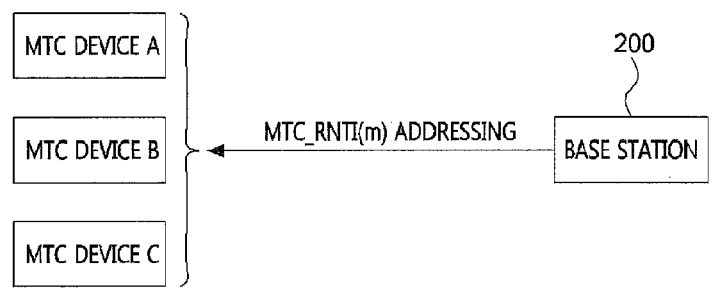
FIG. 5 illustrates a data transfer process to which an MTC group control method according to an example embodiment of the present invention is applied.

FIG. 5 illustrates a data transfer process to which an MTC group control method according to an example embodiment of the present invention is applied.

MTC devices designated as one MTC group have the same MTC_RNTI. When a plurality of MTC devices can receive the same RNTI, the MTC devices do not need to individually receive data transferred by a base station, like unit terminals. As shown in FIG. 5, different RNTIs are not given to MTC device A, MTC device B and MTC device C respectively, but the same MTC_RNTI(m) is given to them for addressing. System broadcasting or paging may be an example embodiment in which MTC group addressing with an MTC_RNTI can be used.

A base station 200 manages an RNTI of a cell. The base station 200 maps an MTC_RNTI to an MTC group Identifier. When an MTC group Identifier is initially input, the base station 200 allocates and maps a new MTC_RNTI to the MTC group Identifier. When a mapping relation between an MTC group Identifier and an MTC_RNTI has been set already, no new operation is required.

Mapping information between an MTC group Identifier and an MTC_RNTI is transferred through an RRC connection reconfiguration message. A terminal receiving the RRC connection reconfiguration message registers the MTC_RNTI in an RNTI combination that the terminal can receive, and thereafter properly uses the MTC_RNTI for message receiving. In this way, an MTC_RNTI may be assigned to an MTC device according to an example embodiment of the present invention.

However, an MTC device does not only receive an MTC_RNTI. Before an attach request is transferred, a terminal is allocated a C_RNTI through an RRC connection establishment process. Thus, an MTC device can be controlled in a one-to-one mode or an MTC group mode.

A base station may control an MTC device using a C_RNTI in the one-to-one mode as shown in FIG. 4, and using an MTC_RNTI in the MTC group mode. In this way, a device can be controlled using different types of RNTIs according to another example embodiment of the present invention.

In other words, in an example embodiment of the present invention, RNTIs distinguished according to MTC devices are used when communication between a base station and an MTC device is performed in the one-to-one mode, and MTC_RNTIs are used when communication between a base station and an MTC device is performed in the MTC group mode.

Figure 6:
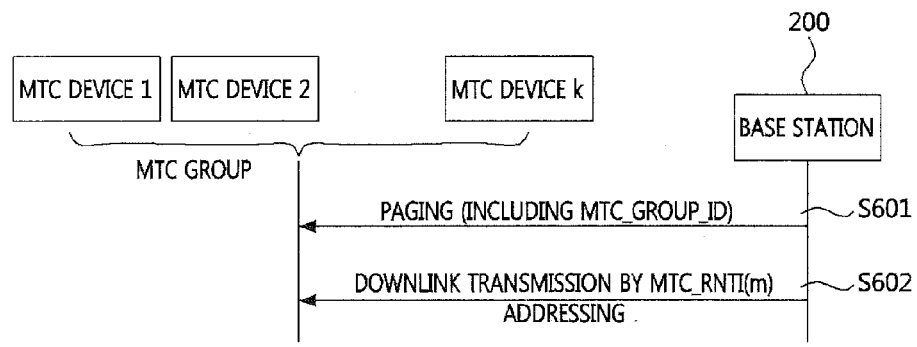
FIG. 6 is a signal flowchart illustrating a method of controlling an MTC group mode according to an example embodiment of the present invention.

FIG. 6 is a signal flowchart illustrating a method of controlling an MTC group mode according to an example embodiment of the present invention.

In most cases, MTC devices do not perform continuous communication with a network. Thus, an RRC connection state between an MTC device and a base station is mostly an idle state. Basically, MTC group mode control is performed without considering respective RRC states of MTC devices.

Thus, as shown in FIG. 6, a base station transmits a paging message to an MTC group to wake MTC devices in the MTC group (S601). In FIG. 6, MTC device 1 to MTC device k belong to one MTC group, and a base station 200 wakes MTC device 1 to MTC device k using one paging message including a common MTC group Identifier.

The paging message includes paging record information about the MTC group Identifier. An MTC device receiving the paging message receives record information corresponding to its MTC group Identifier, and accesses a network or receives downlink data according to the record information (S602). In case a network access is performed, the network access process follows a conventional random access process. In the case of receiving downlink data, the MTC device receives a PDCCH addressed with an MTC_RNTI and operates to receive PDSCH data indicated by the PDCCH (S602).

In consideration of power saving of an MTC device communication module, the base station 200 controls a transmission time, and the MTC device controls a reception time so that downlink data transmission is performed in a reception window time period of the MTC_RNTI a predetermined time after transmission of the paging message. In this way, an MTC group can be controlled through MTC group mode control according to still another example embodiment of the present invention.

While the example embodiments of the present invention and their advantages have been described in detail, it should be understood that various changes, substitutions and alterations may be made herein without departing from the scope of the invention.

What is claimed is:

1. A mobile communication system performing group control for a machine type communication (MTC) service, comprising:
    a mobility management entity (MME) configured to categorize one or more MTC devices into one or more MTC groups, and assign MTC group identifiers to respective MTC groups; and
    a base station configured to set MTC radio network temporary identifiers (MTC RNTIs) according to the MTC group identifiers, and use the MTC_RNTIs for addressing the MTC devices belonging to the respective MTC groups.

2. The mobile communication system of claim 1, wherein the MME receives an attach request from a terminal determines whether or not the terminal is an MTC device, and whether or not the terminal belongs to an MTC group, and
    includes an MTC group identifiers in an attach accept message and transmits the attach accept message to the base station if the terminal having requested the attachment is determined to be an MTC device.

3. The mobile communication system of claim 1, wherein the base station receives the attach accept message including the MTC group identifiers from the MME,
    allocates the MTC_RNTIs according to the MTC group identifiers, and
    transmits mapping information between the MTC group identifiers and the MTC_RNTIs to the MTC devices.

4. The mobile communication system of claim 3, further comprising MTC devices configured to receive the MTC group identifiers and the MTC_RNTIs and register the MTC group identifiers as their identifiers.

5. The mobile communication system of claim 4, wherein the base station transmits a paging message including the MTC group identifiers and paging record information, and downlink data addressed with an MTC_RNTI of a corresponding MTC group, and
    one or more MTC devices in the MTC group receive the paging message to obtain record information corresponding to their MTC group identifiers, and receive the downlink data addressed with the MTC_RNTI using the record information.

6. The mobile communication system of claim 5, wherein the base station controls a transmission time and the MTC devices control a reception time so that the downlink data transmission can be performed in a reception window time period of the MTC_RNTI a predetermined time after transmission of the paging message.

7. A base station communicating with a network and one or more machine type communication (MTC) devices, wherein MTC group identifiers are received from the network,
    MTC radio network temporary identifiers (RNTIs) are set according to the MTC group identifiers, and
    the MTC_RNTIs are used for addressing the MTC devices belonging to MTC groups, wherein an attach accept message including the MTC group identifiers is received from the network, the MTC_RNTIs are allocated to respective MTC group identifiers, and mapping information between the MTC group identifiers and the MTC_RNTIs is transmitted to the MTC devices.

8. The base station of claim 7, wherein the mapping information between the MTC group identifiers and the MTC_RNTIs is transmitted by a radio resource control (RRC) connection reconfiguration message.

9. The base station of claim 7, wherein a paging message including the MTC group identifiers and paging record information is transmitted to one or more MTC devices, and downlink data addressed with an MTC_RNTI of a corresponding MTC group is transmitted.

10. The base station of claim 7, wherein the addressing is performed using RNTIs distinguished according to the MTC devices when communication between the base station and the MTC devices is performed in a one-to-one mode, and using the MTC_RNTIs when the communication between the base station and the MTC devices is performed in an MTC group mode.

* * * * *